(12) United States Patent
Ebina

(10) Patent No.: US 10,908,330 B2
(45) Date of Patent: Feb. 2, 2021

(54) DISPLAY

(71) Applicant: TOPPAN PRINTING CO., LTD., Tokyo (JP)

(72) Inventor: Kazuyoshi Ebina, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 188 days.

(21) Appl. No.: 16/178,726

(22) Filed: Nov. 2, 2018

(65) Prior Publication Data

US 2019/0072695 A1 Mar. 7, 2019

Related U.S. Application Data

(63) Continuation of application No. PCT/JP2017/017287, filed on May 2, 2017.

(30) Foreign Application Priority Data

May 6, 2016 (JP) .................................. 2016-093423
Oct. 25, 2016 (JP) .................................. 2016-208699

(51) Int. Cl.
 *G02B 5/18* (2006.01)
 *G09F 3/02* (2006.01)
 (Continued)

(52) U.S. Cl.
 CPC .............. *G02B 5/18* (2013.01); *B42D 25/324* (2014.10); *B42D 25/328* (2014.10); *G09F 3/02* (2013.01); *G09F 19/12* (2013.01)

(58) Field of Classification Search
 CPC ...... G02B 5/18; B42D 25/324; B42D 25/328; G09F 19/12; G09F 3/02
 See application file for complete search history.

(56) References Cited

U.S. PATENT DOCUMENTS 8,840,146 B2 9/2014 Stalder
2012/0236415 A1* 9/2012 Nagano .................. G02B 30/40
 359/567

FOREIGN PATENT DOCUMENTS

EP 2 960 690 A 12/2015
JP 2012-203266 A 10/2012
(Continued)

OTHER PUBLICATIONS

International Search Report regarding PCT/JP2017/017287, dated Aug. 8, 2017, 2 pps.
(Continued)

*Primary Examiner* — Kimberly N. Kakalec
(74) *Attorney, Agent, or Firm* — Foley & Lardner LLP

(57) ABSTRACT

The display of the present invention includes an uneven-structure-forming layer having a surface provided with a plurality of concavities or a plurality of convexities respectively provided with flat bottoms and flat tops substantially parallel to the flat bottoms, and a light reflecting layer covering all or a part of an uneven surface of the uneven-structure-forming layer. The uneven-structure-forming layer is provided with two kinds of uneven-structure-forming regions. Each of the two kinds of uneven-structure-forming regions has a constant optical distance between the flat bottoms and the flat tops, but the optical distance is different between the two kinds of regions. The two kinds of uneven-structure-forming regions are alternately arrayed. The optical distances in the two kinds of uneven-structure-forming regions have respective set values which are so selected, when forming the uneven surface of the uneven-structure-forming layer, to form a combination contributing to reduction of a color shift of the display.

12 Claims, 8 Drawing Sheets

(51) Int. Cl.
*B42D 25/328* (2014.01)
*B42D 25/324* (2014.01)
*G09F 19/12* (2006.01)

(56) References Cited

FOREIGN PATENT DOCUMENTS

JP 5570210 B 8/2014
WO WO-2015/172190 A 11/2015

OTHER PUBLICATIONS

European Search Report dated Sep. 26, 2019 for corresponding Application No. 17792774.6 (7 pages).

\* cited by examiner

FIG.6A
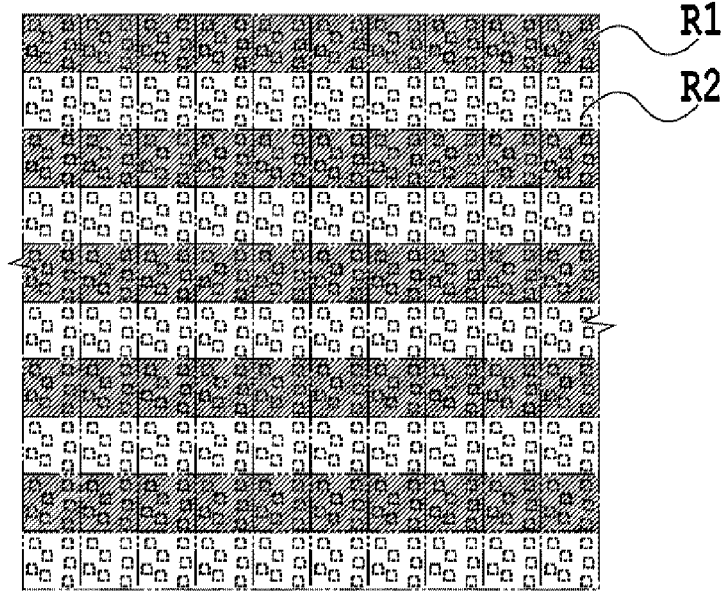
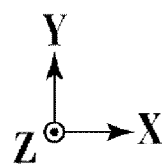
FIG.6B
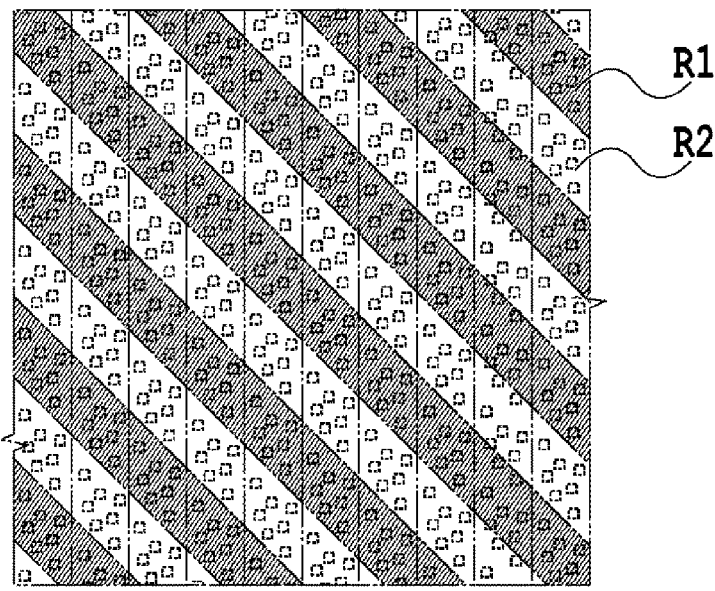
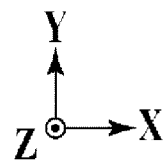

imagesize(1700,2200)
DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/017287, filed on May 2, 2017, which is based upon and claims the benefit of priority to Japanese Patent Application No. 2016-093423, filed on May 6, 2016, and Japanese Patent Application No. 2016-208699, filed on Oct. 25, 2016, the disclosures of which are all hereby incorporated herein by reference in their entireties.

TECHNICAL FIELD

The present invention relates to a display.

BACKGROUND ART

Some techniques are known for developing colors in a display. Such techniques include a method, such as printing, in which a colorant such as a pigment or a dye is applied to a surface of the display, or a method in which asperities are provided on the display without using a colorant for developing colors.

In particular, the latter method, that is, color development based on the method of providing asperities is called structural color development (structural color). The structural color is caused by light diffraction, light scattering, thin film interference, multilayer film interference, or the like, through radiation of light to a fine structure of about several micrometers to several nanometers.

CITATION LIST

[Patent Literature] [PTL 1] JP 5570210 B

SUMMARY OF THE INVENTION

Technical Problem

Among the structures expressing structural colors, for example, a periodic structure typified by a diffraction grating differs greatly in terms of appearance from color development using colorant. For example, the difference resides in iridescent change of the color on the display surface with gradual change of the observation angle. Therefore, this structure enables color development which cannot be expressed by a method such as printing. However, due to the change of color depending on the observation angle, this structure is not able to fix the displayed colors. Therefore, there is a limitation when only using this structure in an application where colors are required to be distinguished.

To cope with this, another type of display has been developed. In this display, the change of color does not change to such a great extent depending on the observation angle (PTL 1). In this type of display, the change of color is not so great even if the observation direction is slightly changed. This is because when light is incident on the uneven structure provided to the display surface, diffracted light is emitted in various directions.

However, in this display, the distance between flat bottoms and flat tops of the uneven structure needs to be determined with high dimensional accuracy in order to develop a desired color. Determining the distance with high accuracy is not easy, that is, the set color is likely to be shifted from the color actually displayed.

Solution to Problem

A display of the present embodiment includes an uneven-structure-forming layer having a surface provided with a plurality of concavities or a plurality of convexities respectively provided with flat bottoms and flat tops substantially parallel to the flat bottoms, and a light reflecting layer covering all or a part of an uneven surface of the uneven-structure-forming layer, characterized in that: the uneven-structure-forming layer is provided with two kinds of uneven-structure-forming regions, wherein each of the two kinds of uneven-structure-forming regions has a constant optical distance between the flat bottoms and the flat tops, the optical distance being different between the two kinds of regions; the two kinds of uneven-structure-forming regions are alternately arrayed; and the optical distances in the two kinds of uneven-structure-forming regions have respective set values which are so selected, when forming the uneven surface of the uneven-structure-forming layer, to form a combination contributing to a reduction of a color shift of the display.

A display of the present embodiment includes an uneven-structure-forming layer having a surface provided with a plurality of concavities or a plurality of convexities respectively provided with flat bottoms and flat tops substantially parallel to the flat bottoms, and a light reflecting layer covering all or a part of an uneven surface of the uneven-structure-forming layer, characterized in that: the uneven-structure-forming layer is provided with two kinds of uneven-structure-forming regions; the uneven-structure-forming region each have a constant optical distance between the flat bottoms and the flat tops; of the two kinds of uneven-structure-forming regions, the optical distance in one kind of uneven-structure-forming region is selected from a range of 90-308 nm, and the optical distance in the other kind of uneven-structure-forming region is selected from a range of 252-385 nm, or the optical distance in one kind of uneven-structure-forming region is selected from a range of 252-385 nm, and the optical distance in the other kind of uneven-structure-forming region is selected from a range of 315-561 nm, or the optical distance in one kind of uneven-structure-forming region is selected from a range of 315-561 nm, and the optical distance in the other kind of uneven-structure-region is selected from a range of 459-660 nm, the optical distance being different between the uneven-structure-forming regions; and the at least the two kinds of uneven-structure-forming regions are alternately arrayed.

Advantageous Effects of Invention

The display of the present embodiment can reduce or suppress color shift at the time of production or the like. Therefore, manufacturing productivity can be increased.

BRIEF DESCRIPTION OF THE DRAWINGS

FIG. 6A is a schematic plan view showing an example of an uneven structure provided to the uneven-structure-forming regions of the display according to the present embodiment.

FIG. 6B is a schematic plan view showing an example of the uneven structure provided to the uneven-structure-forming regions of the display according to the present embodiment.

DESCRIPTION OF THE REPRESENTATIVE EMBODIMENT

Figure 1A:
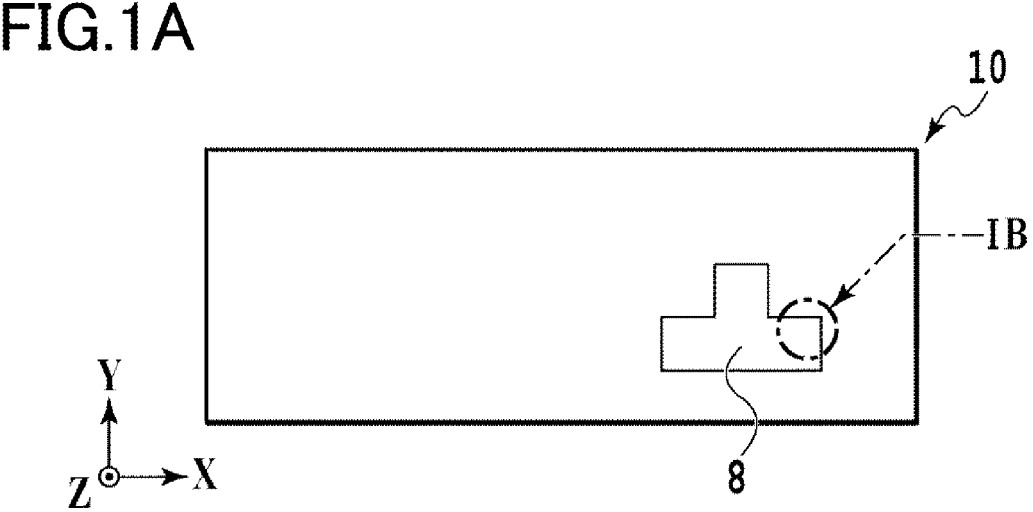
FIG. 1A is a schematic plan view showing an example of a display according to the present embodiment.

With reference to the drawings, an embodiment of the present invention will be described in detail. It is to be understood that the present invention is not limited to the following embodiment, which is intended to be representative of the present invention. The representative embodiment described below is merely an example of the present invention, and the design thereof could be appropriately changed by one skilled in the art. Incidentally, unless there is a reason for the sake of convenience, the same reference signs will be used for identical components, and redundant explanations will be omitted. It will be noted that in the drawings, like or corresponding parts are designated by like reference numerals and redundant illustrations therefor are omitted. The dimensional ratios in the drawings should not be construed as limited to those ratios shown therein. Furthermore, in the present specification, the mark "–" means that the lower limit and the upper limit before and after the mark are included in the indicated range.

<Display>

A display according to the present embodiment has a surface provided with an uneven-structure-forming layer having a plurality of concavities or convexities, and a light reflecting layer covering part or all of an uneven surface of the uneven-structure-forming layer. The uneven-structure-forming layer includes two kinds of uneven-structure-forming regions. An optical distance between flat bottoms and flat tops is constant within each uneven-structure-forming region, and the optical distance is selected from a specific range, but optical distances are different between the different kinds of the uneven-structure-forming regions. Furthermore, the two kinds of uneven-structure-forming regions are alternately arrayed.

Figure 1B:
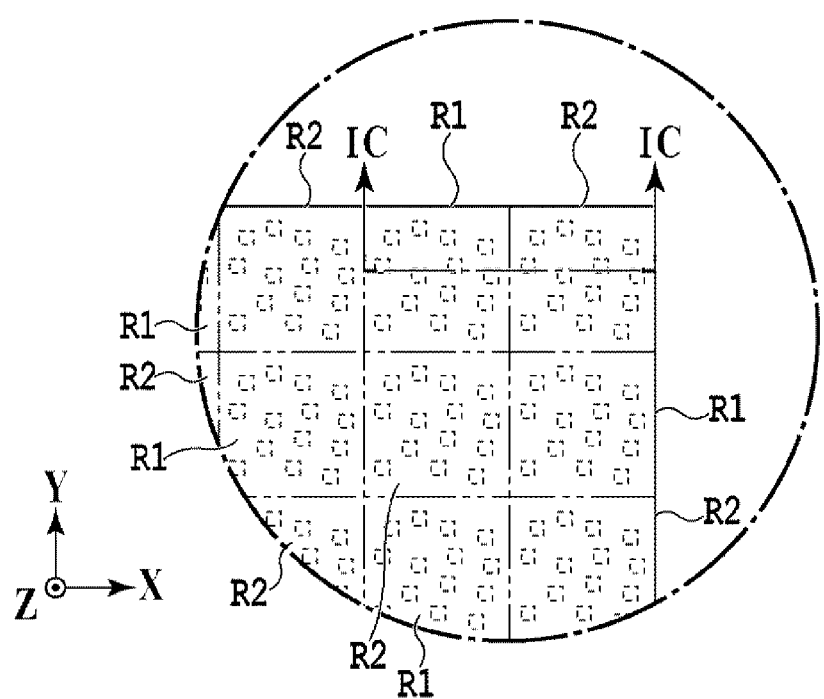
FIG. 1B is an enlarged view of a portion circled by the dash-dot line in the plan view of FIG. 1A.
Figure 1C:
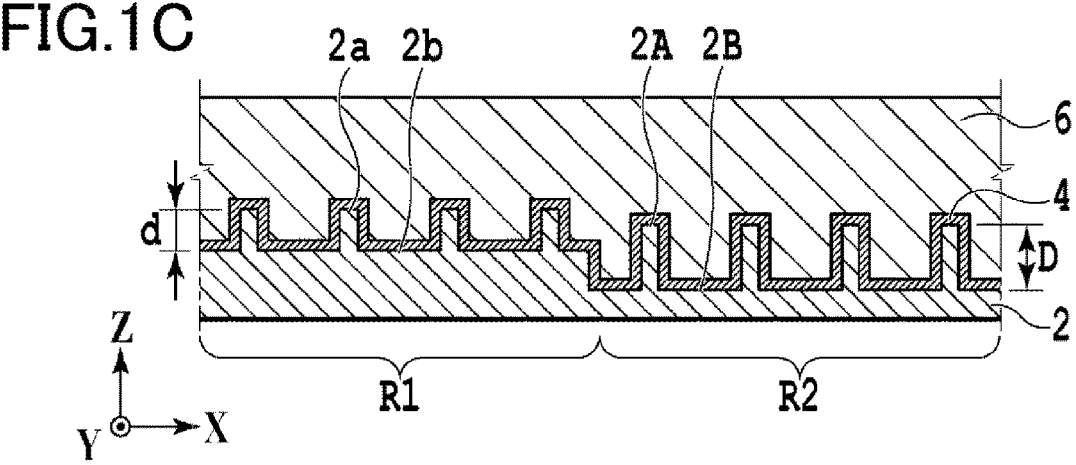
FIG. 1C is a cross-sectional view taken along the line 1C-1C of FIG. 1B.

FIG. 1A is a schematic plan view showing an example of the display according to the present embodiment. FIG. 1B is an enlarged view of the portion circled by the dash-dot line in the plan view of FIG. 1A. FIG. 1C is a cross-sectional view taken along the line 1C-1C of FIG. 1B. In FIG. 1A, the X direction and the Y direction are parallel to the display surface and perpendicular to each other. The Z direction is perpendicular to the X and Y directions.

As shown in FIG. 1C, a display 10 is provided with an uneven-structure-forming layer 2 having convexities, and a light reflecting layer 4 covering the uneven surface of the uneven-structure-forming layer 2. Although it is mentioned above that the uneven-structure-forming layer 2 is provided with convexities as shown in FIG. 1C, concavities may be provided instead of the convexities. That is, there may be provided a plurality of concavities on a surface, having flat bottoms 2b, 2B, and flat tops 2a, 2A that are substantially parallel to the flat bottoms 2b, 2B. Therefore, in the present specification, description of convexities may be read as description of concavities, as appropriate.

The optical action and effect of the display 10 described below are also applicable to the case where concavities are provided, instead of the convexities. Components of the display 10 will be described below.

(Uneven-Structure-Forming Layer)

The uneven-structure-forming layer 2 has light permeability. The layer is typically transparent, and in particular, colorless and transparent.

As shown in FIG. 1C, the uneven-structure-forming layer 2 has a surface that is provided with a plurality of convexities having flat bottoms 2b and 2B, and flat tops 2a and 2A which are substantially parallel to the flat bottoms 2b and 2B. Details of the uneven structure of the uneven-structure-forming layer 2 will be described later in the section "Uneven structure in each uneven-structure-forming region of the uneven-structure-forming layer".

Materials that can be used for the uneven-structure-forming layer 2 include a thermoplastic resin, a thermosetting resin, or a photo curable resin.

As an example, an olefin resin can be used, and specifically, polypropylene (PP), polyethylene (PE), vinyl chloride, or the like can be used. These materials are easily processed and flexible, and the finished product has a good tactile feel.

As another example, a commonly used transparent resin may be used as the material. Examples of a resin that is relatively easy to process include polycarbonate resin, methyl methacrylate styrene (MS) resin, and the like. Use of these resins can impart the uneven-structure-forming layer 2 with characteristics of it being unlikely to be broken due to their good impact resistance. Use of an acrylic resin or a polystyrene resin can impart good rubbing resistance. Use of a thermosetting resin or a photo curable resin can impart hard coating properties. The hard coating properties may refer to the hardness in the range of H or more and 5H or less in the pencil hardness test (JIS K5600 5-4).

The refractive index of the uneven-structure-forming layer 2 may be in the range of 1.4-1.6. The thickness of the uneven-structure-forming layer 2 may be in the range of 1-10 μm.

The uneven-structure-forming layer 2 may include a base material on the surface opposite to the uneven surface. In this case, the base material serves as a base of the uneven-structure-forming layer 2, and also serves to protect the uneven-structure-forming layer 2. As a result, the display 10 will have a higher strength with a reduced thickness. The base material may have hard coating properties.

The material used for the base material may be a resin. The resin may be a thermoplastic resin, a thermosetting resin, or an ultraviolet curable resin. The thermoplastic resin may be an olefin resin. The olefin resin may be a polypropylene, polyethylene, or polyethylene terephthalate (PET).

The thermosetting resin may be a urethane resin. The ultraviolet curable resin may be an acrylic resin. The thermosetting resin and the ultraviolet curable resin have high heat resistance. The ultraviolet curable resin has hard coating properties. The base material may have a refractive index in the range of 1.4-1.6. The base material may have a thickness in the range of 1-100 µm. The base material may be in a sheet-like shape, with the front and back surfaces thereof being parallel to each other.

(Light Reflecting Layer)

The light reflecting layer 4 reflects light.

In the example shown in FIG. 1C, the light reflecting layer 4 covers all the surface of the uneven-structure-forming layer 2 on which the uneven structure is provided, but the light reflecting layer 4 may cover at least part of the surface. The modes for covering at least part of the light reflecting layer 4 may be one in which only the flat bottoms 2b and 2B and the flat tops 2a and 2A of the convexities of the uneven-structure-forming layer 2 are covered, and the side surfaces are not covered.

The light reflecting layer 4 may be a metal layer. The material that can be used as the metal layer may be aluminum, silver, gold, or alloys thereof. Alternatively, a dielectric layer having a refractive index different from that of the uneven-structure-forming layer 2 may be used as the light reflecting layer 4. An inorganic compound can be used for the dielectric layer. The inorganic compound is preferably a metal compound. Examples of the metal compound include titanium oxide, aluminum oxide, or zinc sulfide. Alternatively, the light reflecting layer 4 may be a laminate of dielectric layers, i.e., a dielectric multilayer film, with the refractive index being different between adjacent dielectric layers. Of the dielectric layers included in the dielectric multilayer film, the dielectric layer which is in contact with the uneven-structure-forming layer 2 desirably has a refractive index different from the refractive index of the uneven-structure-forming layer 2. The light reflecting layer 4 preferably has a thickness in the range of 40-1000 nm.

(Optional Layers)

The display 10 may further include other layers such as a transparent layer and an adhesive layer.

The transparent layer serves as a layer for protecting the surface of the display 10. For example, as shown in FIG. 1C, if the front surface (display surface) is on the light reflecting layer 4 side, the transparent layer 6 covers the light reflecting layer 4 to protect the light reflecting layer 4. In contrast, if the front surface (display surface) is on the uneven-structure-forming layer 2 side, the transparent layer 6 covers the uneven-structure-forming layer 2 to protect the uneven-structure-forming layer 2. The transparent layer preferably has hard coating properties.

The material used for the transparent layer 6 may be a transparent resin. The transparent resin may be a curable resin. The curable resin has hard coating properties. The curable resin may be an ultraviolet curable resin.

The transparent layer 6 may have a refractive index in the range of 1.4-1.6. The transparent layer 6 may have a thickness in the range of 1-5 µm.

The adhesive layer is provided to impart an adhesive force to the display 10 when the display 10 is used being affixed to a card, paper, plastic film, or the like.

If the front surface is on the light reflecting layer 4 side, the adhesive layer may be provided to the surface of the uneven-structure-forming layer 2, on a side opposite to the light reflecting layer 4. The adhesive layer may have a thickness in the range of 1-50 µm.

The material used for the adhesive layer may be a resin adhesive. The resin adhesive may be an acrylic adhesive.

(Uneven structure in each uneven-structure-forming region of uneven-structure-forming layer) A description will now be given of the uneven structure in each uneven-structure-forming region of the uneven-structure-forming layer 2.

The uneven-structure-forming layer 2 has a surface that is provided with a plurality of concavities or convexities having flat bottoms, and flat tops substantially parallel to the flat bottom, and includes at least two kinds of uneven-structure-forming regions. In each uneven-structure-forming region, the optical distance is constant between the flat bottoms and the flat tops. The distance between the flat bottoms and the flat tops may be in the range of 55-470 nm.

The example structure shown in FIGS. 1A-1C shows the display 10 having two kinds of uneven-structure-forming regions. As shown in FIG. 1C, in a first uneven-structure-forming region R1 (hereinafter also referred to as first region R1) of the uneven-structure-forming layer 2, a distance d between each flat bottom 2b and each flat top 2a (the height of the top of each convexity with the flat bottom as a reference plane) is constant. In a second uneven-structure-forming region R2 (hereinafter also referred to as second region R2), a distance D between each flat bottom 2B and each flat top 2A is constant. The distance d in the first region R1 differs from the distance D in the second region R2. Thus, the distance between each flat bottom 2b, 2B, and each flat top 2a, 2A is constant in each uneven-structure-forming region, but is different between the regions. If the distance between each flat bottom 2b, 2B, and each flat top 2a, 2A is constant in each uneven-structure-forming region, a specific color corresponding to the height of the convexities is perceived. If the distance between each flat bottom 2b and 2B, and each flat top 2a and 2A is not constant, interference occurs due to light of different wavelengths, and light of various wavelengths is displayed. Therefore, a specific color corresponding to the height of the convexities is not displayed. To cope with this, in the display 10, the distances between the flat bottoms 2b, 2B, and the flat tops 2a, 2A are made different between the uneven-structure-forming regions, and thus, the display 10 displays a mixture of colors of specific colors generated in the regions.

In the example shown in FIG. 1C, the flat bottom 2b in the first region R1 is not flush with the flat bottom 2B in the second region R2, but the flat bottoms 2b and 2B may be flush with each other.

Figure 2:
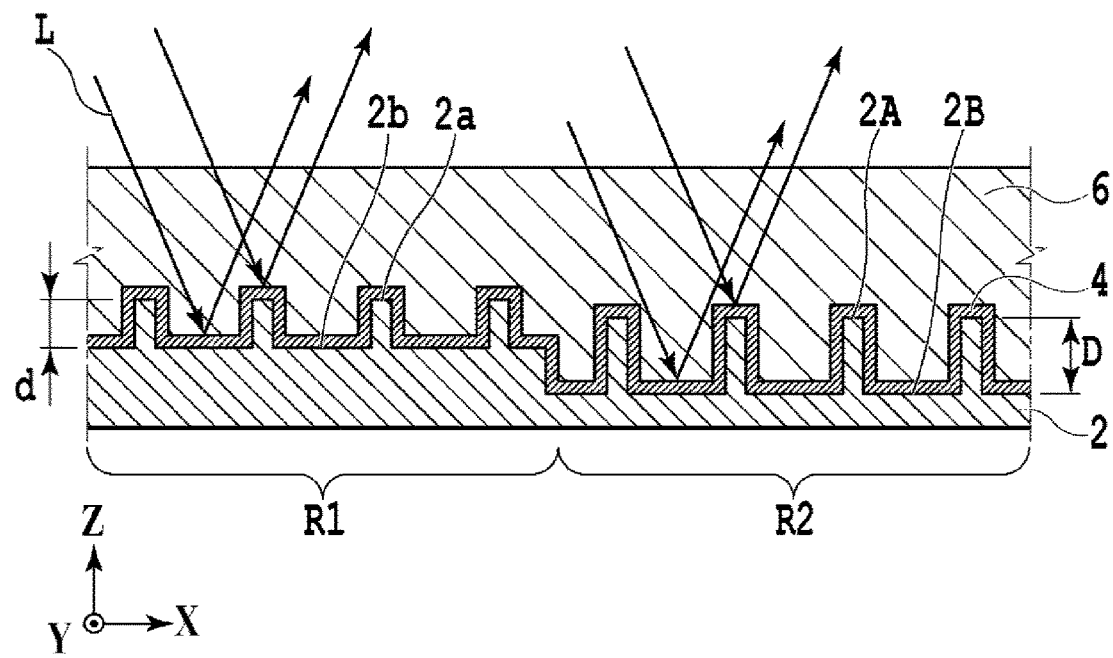
FIG. 2 is a schematic diagram showing light that is incident on convexities provided to uneven-structure-forming regions of the display, and reflected at flat bottoms and flat tops according to the present embodiment.

In the above, the display 10 has been described as displaying a specific color according to the distance (height of the convexities) between the flat bottom and the flat top, but more precisely, may be described as follows. The display 10 actually displays a specific color according to a value obtained by multiplying the distance between the flat bottom and the flat top by a refractive index n of the medium (hereinafter also referred to as optical distance between the flat bottom and the flat top) because the light incident on the display 10 travels through the medium before reaching the uneven surface. For example, as shown in FIG. 2, if the front surface (display surface) is on the light reflecting layer 4 side and the light reflecting layer 4 is protected with the transparent layer 6, light L incident on the display 10 travels through the transparent layer 6 before reaching the uneven surface of the light reflecting layer 4. In this case, the material constituting the transparent layer 6 is the medium, and the refractive index of the transparent layer 6 is the refractive index of the medium. If the front surface (display surface) is on the uneven-structure-forming layer 2 side, the light L incident on the display 10 travels through the uneven-structure-forming layer 2 before reaching the uneven surface of the light reflecting layer 4. In this case, the refractive index of the uneven-structure-forming layer 2 is the refractive index of the medium.

As described above, if the front surface (display surface) is on the light reflecting layer 4 side, an optical distance n·d is obtained by multiplying the distance between the flat bottom 2b, 2B, and the flat top 2a, 2A (the height d, D of the convexities with the flat bottom as a reference plane) by the refractive index n of the transparent layer 6. If the front surface (display surface) is on the uneven-structure-forming layer 2 side, the optical distance n·d is obtained by multiplying the distance between the flat bottoms 2b and 2B, and the flat tops 2a and 2A (the depth d, D of the concavities with the flat bottom as a reference surface) by the refractive index n of the uneven-structure-forming layer 2.

In this manner, the display 10 displays a color corresponding to the optical distance between the flat bottoms and the flat tops.

In the display 10, the uneven-structure-forming layer 2 includes at least two kinds of uneven-structure-forming regions. The optical distance between the flat bottoms and the flat tops in each of the uneven-structure-forming regions is selected from specific ranges. That is, the optical distance between the flat bottoms and the flat tops in one kind of uneven-structure-forming region may be selected from the range of 90-308 nm, preferably from the range of 100-280 nm, more preferably from the range of 110-280 nm, and the optical distance between the flat bottoms and the flat tops in the other uneven-structure-forming region may be selected from the range of 252-385 nm, preferably from the range of 280-350 nm, and more preferably from the range of 280-315 nm. Alternatively, the optical distance between the flat bottoms and the flat tops in one kind of uneven-structure-forming region may be selected from the range of 252-385 nm, preferably from the range of 280-350 nm, more preferably from the range of 308-350 nm, and the optical distance between the flat bottoms and the flat tops in the other kind of uneven-structure-forming region may be selected from the range of 315-561 nm, preferably from the range of 350-510 nm, more preferably from the range of 350-459 nm. Alternatively, the optical distance between the flat bottoms and the flat tops in one kind of uneven-structure-forming region may be selected from the range of 315-561 nm, preferably from the range of 350-510 nm, more preferably from the range of 459-510 nm, and the optical distance between the flat bottoms and the flat tops in the other kind of uneven-structure-forming region may be selected from the range of 459-660 nm, preferably from the range of 510-600 nm, more preferably from the range of 510-540 nm. Note that, the optical distance between the flat bottoms and the flat tops is taken to be different between the two kinds of uneven-structure-forming regions.

If the uneven-structure-forming layer 2 has two kinds of uneven-structure-forming regions, the optical distance between the flat bottoms and the flat tops in one of the uneven-structure-forming regions is selected from the range of 90-308 nm, preferably from the range of 100-280 nm, more preferably from the range of 110-280 nm, and the optical distance in the other kind of uneven-structure-forming region is selected from the range of 252-385 nm, preferably from the range of 280-350 nm, more preferably from the range of 280-315 nm. Alternatively, the optical distance between the flat bottoms and the flat tops in one kind of uneven-structure-forming region is selected from the range of 252-385 nm, preferably from the range of 280-350 nm, more preferably from the range of 308-350 nm, and the optical distance in the other kind of uneven-structure-forming region is selected from the range of 315-561 nm, preferably from the range of 350-510 nm, more preferably from the range of 350-459 nm. Alternatively, the optical distance between the flat bottoms and the flat tops in one kind of uneven-structure-forming region is selected from the range of 315-561 nm, preferably from the range of 350-510 nm, more preferably from the range of 459-510 nm, and the optical distance in the other kind of uneven-structure-forming region is selected from the range of 459-660 nm, preferably from the range of 510-600 nm, more preferably from the range of 510-540 nm. Note that, the optical distance between the flat bottoms and the flat tops is taken to be different between the two kinds of uneven-structure-forming regions.

In each uneven-structure-forming region of the display 10, a plurality of concavities or convexities are arranged on the uneven-structure-forming layer 2.

In the example shown in FIG. 1B, a plurality of convexities are randomly arranged in the first region R1 and the second region R2. In the present specification, the expression "convexities are randomly arranged" means that the convexities are arranged so that the center-to-center distance between adjacent convexities will not be constant. The convexities may be randomly arranged as in the example shown in FIG. 1B, but may also be arranged with the center-to-center distance between adjacent convexities being made constant. The convexities may be regularly arranged.

The (average) center-to-center distance between adjacent convexities may be in the range of 0.5-10 μm. The (average) center-to-center distance of adjacent convexities may be less than 1 μm in order to diffract visible light.

As shown in FIG. 1B, the flat top of each convexity may be square in plan view. However, the shape is not limited to this, and may be a convex hull shape. Shapes that can be adopted for the flat top of each convexity in plan view include a triangle, a quadrant such as a rectangle or a trapezoid, a polygon such as a pentagon or a hexagon, a circle, or, an ellipse. Convexities of different shapes may be mixed. To easily produce the display 10, the flat top of each convexity preferably has a rectangular shape, and more preferably has a square shape.

The side surface of each convexity extending from the flat top to the flat bottom may be perpendicular or may be oblique to the flat bottom. The side surface may be a flat surface, or a curved surface such as a concave surface and a convex surface. The curved surface such as a convex surface includes an arc surface. If the side surface is a curved surface, both optical performance and formability are easily achieved.

The flat top of each convexity can have long and short sides each being less than 2 μm for the necessity of visible light being diffracted. The long side and the short side are defined as follows. Of the line segments connecting between two points on the outline of the flat top of each convexity, the longest one is defined as the long side. Then, a rectangle is drawn circumscribing the outline of the flat top of the convexity so as to have a side parallel to the long side, and each short side of the rectangle is defined as the short side of the flat top of the convexity. If the shape of the flat top of each convexity has a square shape or the like with sides of equal length and corners of equal internal angle, the long side and the short side should have an equal length.

In each uneven-structure-forming region, the area ratio occupied by the flat tops of the convexities in plan view can be in the range of 15%-80%. The expression "area ratio occupied by the flat tops of the convexities" is a percentage of the area occupied by the flat tops of the convexities with respect to the area of each uneven-structure-forming region. When the ratio of the flat top area to the flat bottom area of the convexities is 1:1, the area ratio occupied by the flat tops of the convexities is 50%. In the uneven-structure-forming layer 2 of the display 10, a plurality of uneven-structure-forming regions having different optical distances are provided. As a result, the observer recognizes the color displayed on the display 10 based on the overlap of the diffracted light emitted from the uneven-structure-forming regions. Because the overlap of light from different wavelength regions makes the color closer to white, the chroma level of the color displayed on the display 10 tends to decrease. The chroma level of the color displayed on the display 10 changes depending on the area ratio occupied by the flat tops of the convexities. Thus, the chroma level can be enhanced by appropriately setting the area ratio.

If the area ratio is set excessively high in the case of arranging the convexities in each uneven-structure-forming region, there may appear spots in each of which the distance between the adjacent convexities is extremely small. Therefore, the adjacent convexities interfere with each other, and the two convexities concerned may not function as independent convexities. Thus, when arranging the convexities, the area ratio occupied by the flat tops of the convexities is preferably in the range of 26%-31%, and more preferably in the range of 26%-28%, in view of the balance between the effect of improving the chroma level and the limitation in terms of arrangement of the convexities.

Description so far has been given of the uneven structure in the uneven-structure-forming regions of the uneven-structure-forming-layer 2. The (optical) distance between each flat bottom and each flat top may differ between the regions, but the (average) center-to-center distance between adjacent convexities, the shape of the flat top of each convexity, the area ratio occupied by the flat tops of the convexities, or the like may be the same or different between the regions.

(Arrays of Uneven-Structure-Forming Regions)

A description will be given of an array of each uneven-structure-forming region provided with the uneven structure.

The uneven-structure-forming layer 2 is provided with two kinds of uneven-structure-forming regions. The two kinds of uneven-structure-forming regions are alternated.

In the example shown in FIG. 1B, the first region R1 and the second region R2, which are the two kinds of uneven-structure-forming regions, are arrayed alternately (checkerwise) in the X direction and the Y direction. In the figure, the outlines of the first and second regions R1 and R2 are each shown as a square shape by the dash-dot-dot lines. However, these lines are only used for making the outlines of the regions clear, and are not actually present.

The outlines of the uneven-structure-forming regions may each be in a shape of a square, triangle, quadrangle such as a rectangle, parallelogram or trapezoid, or a polygon such as a pentagon or hexagon.

The array of the uneven-structure-forming regions may be alternately arranged in a honeycomb shape.

Furthermore, alternately arranging each uneven-structure-forming region includes forming a plurality of rows/columns of uneven-structure-forming regions in parallel, and alternately arranging the rows/columns formed for the respective regions. FIGS. 6A and 6B show the example of this.

In the example shown in FIG. 6A, rows of a plurality of first regions R1 formed parallel to the X direction are alternated in the Y direction with rows of a plurality of second regions R2 formed parallel to the X direction. That is, rows each composed of a plurality of first regions R1, and rows each composed of a plurality of second regions R2 are arranged in a stripe shape. In this example, the outlines of the first region R1 and the second region R2 are each in a square shape. The arrangement and the number of the convexities are the same between the first region R1 and the second region R2.

FIG. 6B shows an example in which the parallel arraying direction of the first region R1 and the second region R2 intersects the X and Y directions at approximately 45 degrees. In this example, the outlines of the first region R1 and the second region R2 are each in a diamond shape. The arrangement and the number of the convexities are the same between the first region R1 and the second region R2.

Figure 7:
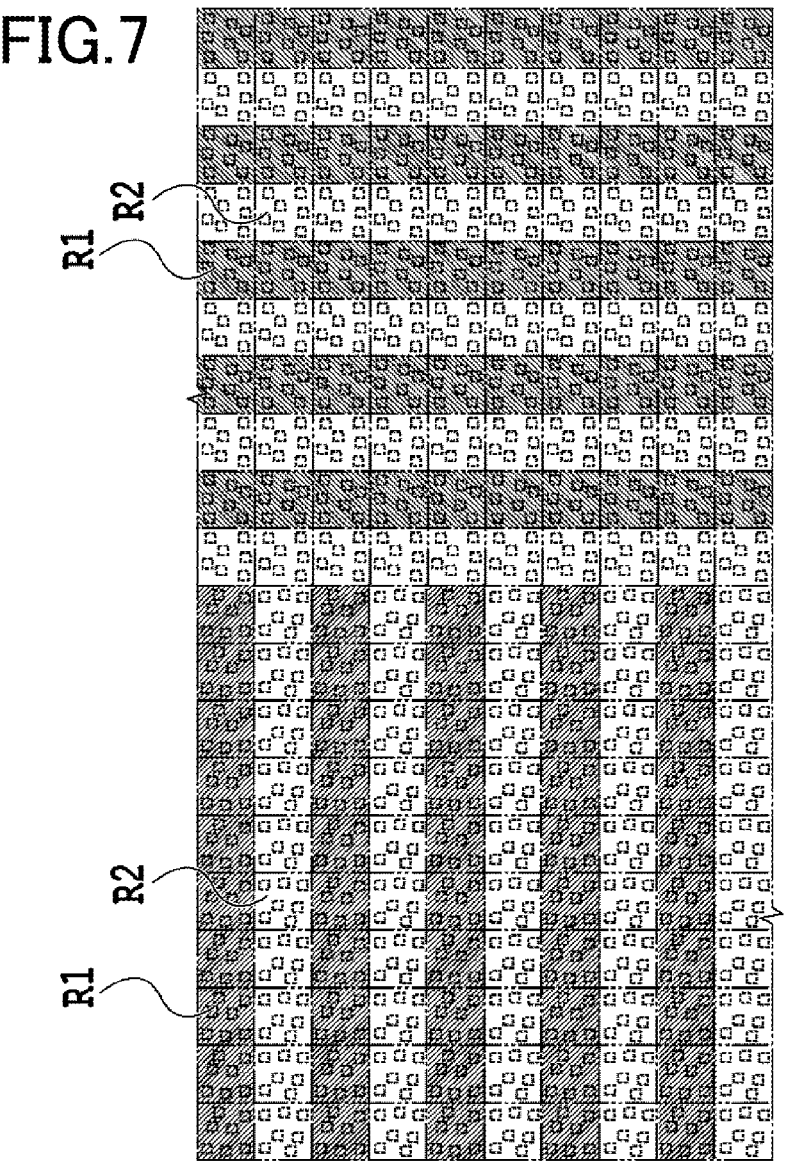
FIG. 7 is a schematic plan view showing an example of the uneven structure provided to the uneven-structure-forming regions of the display according to the present embodiment.

In the example shown in FIG. 7, rows/columns composed of the first region R1 and rows/columns composed of the second region R2 are arranged in a stripe shape, similarly to the example shown in FIGS. 6A and 6B. In the example shown in FIG. 7, the left half is an area (lateral stripe area) in which the parallel arraying direction of the first region R1 and the second region R2 is the X direction. The right half is an area (vertical stripe area) in which the parallel arraying direction of the first region R1 and the second region R2 is the Y direction. In the example shown in FIG. 7, the convexities in the first region R1 are arranged differently from the convexities in the second region R2. Therefore, in the lateral stripe area, the repetition cycle of the convexities in the first regions R1 (or the convexities in the second regions R2) is shorter in the X direction than in the Y direction. Thus, in the lateral stripe area, diffracted light is easily generated in the X direction than in the Y direction. Based on the same idea, in the vertical stripe area, diffracted light is more likely to be generated in the Y direction than in the X direction. Such an optical effect can be imparted to the display 10 depending on the arrays of the uneven-structure-forming regions.

In the examples shown in FIGS. 6A, 6B, 7, the rows/columns of the first and second regions R1 and R2 are shown to have the same width, but the width may be different between these regions.

The uneven-structure-forming layer 2 may include a structure other than the uneven structure which has been described in the above "uneven structure in each uneven-structure-forming region of the uneven-structure-forming layer" section.

Figure 8A:
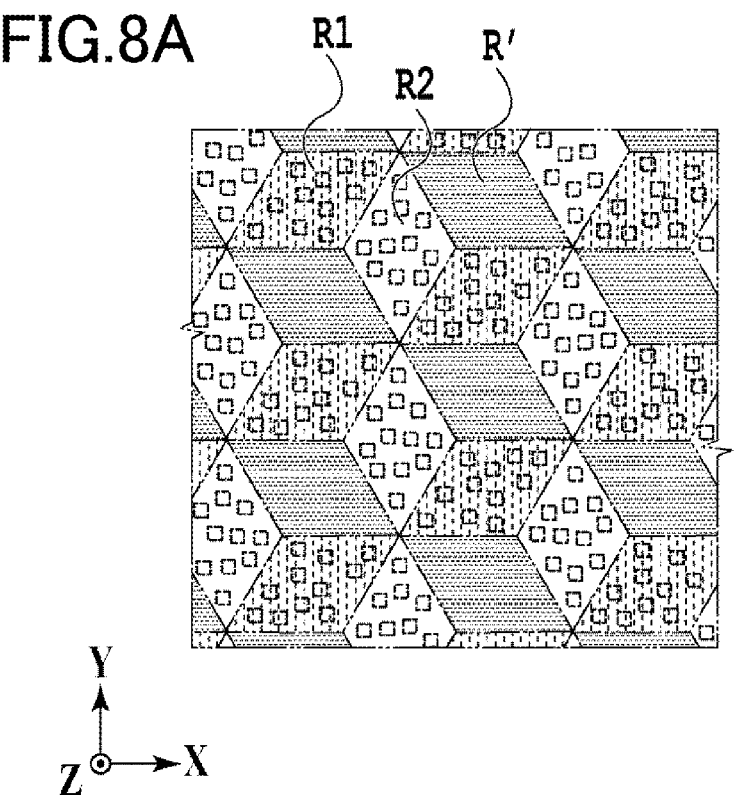
FIG. 8A is a schematic plan view showing an example of a structure provided to the uneven-structure-forming layer of the display according to the present embodiment.
Figure 8B:
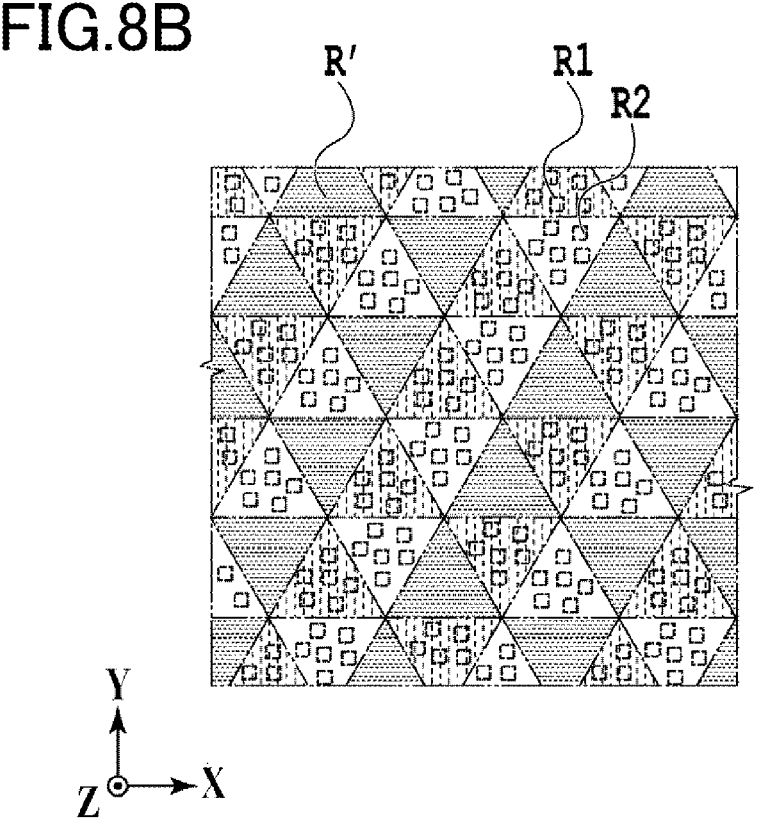
FIG. 8B is a schematic plan view showing an example of a structure provided to the uneven-structure-forming layer of the display according to the present embodiment.

FIG. 8A is a plan view showing an example in which another kind of regions R' each having a flat structure is included, in addition to the first region R1 and the second region R2. In this figure, three kinds of regions, that is, the first region R1, the second region R2, and the other region R' are alternately arranged, these regions each having an outline of a diamond shape. FIG. 8B is a plan view showing an example in which the first region R1, the second region R2, and another region R' having the flat structure are alternately arranged, these regions each having an outline of a triangle shape. In the example shown in FIGS. 8A and 8B, each region R' includes a flat structure. However, the structure is not limited to this, but may be a diffraction grating. Furthermore, each region R' may be a transmissive region. The region R' may also be provided with a printing layer.

Each uneven-structure-forming region desirably has an outline in which the lengths of the long and short sides are not easily visually distinguished from each other, and more desirably has sides of 200 μm or less. The long side and the short side are defined as follows. Of the line segments connecting between two points on the outline of each uneven-structure-forming region, the longest one is defined as a long side. Then, a rectangle is drawn circumscribing the outline of the uneven structure forming regions so as to have a side parallel to the long side, and each short side of the rectangle is defined as a short side of the outline of the uneven-structure-forming region.

As described above, the uneven-structure-forming layer 2 of the display 10 includes at least two kinds of uneven-structure-forming regions which are alternately arrayed.

In the display 10, collections of the uneven-structure-forming regions can display words, graphics, symbols, and other marks. As shown in FIG. 1A, in the display 10, the first region R1 and the second region R2 are arrayed in conformity with the shape of the convex mark 8 to display the convex mark. To display the mark 8 in a specific color, the optical distance in each region of the above-described uneven-structure-forming region may be set to a value corresponding to the specific color. In the display 10, if a plurality of marks are displayed, optical distances are set for each mark to develop colors for each mark.

(Reduction of Color Shift)

A description will be given of the reason why color shift is unlikely to occur when the display 10 is produced.

Figure 3:
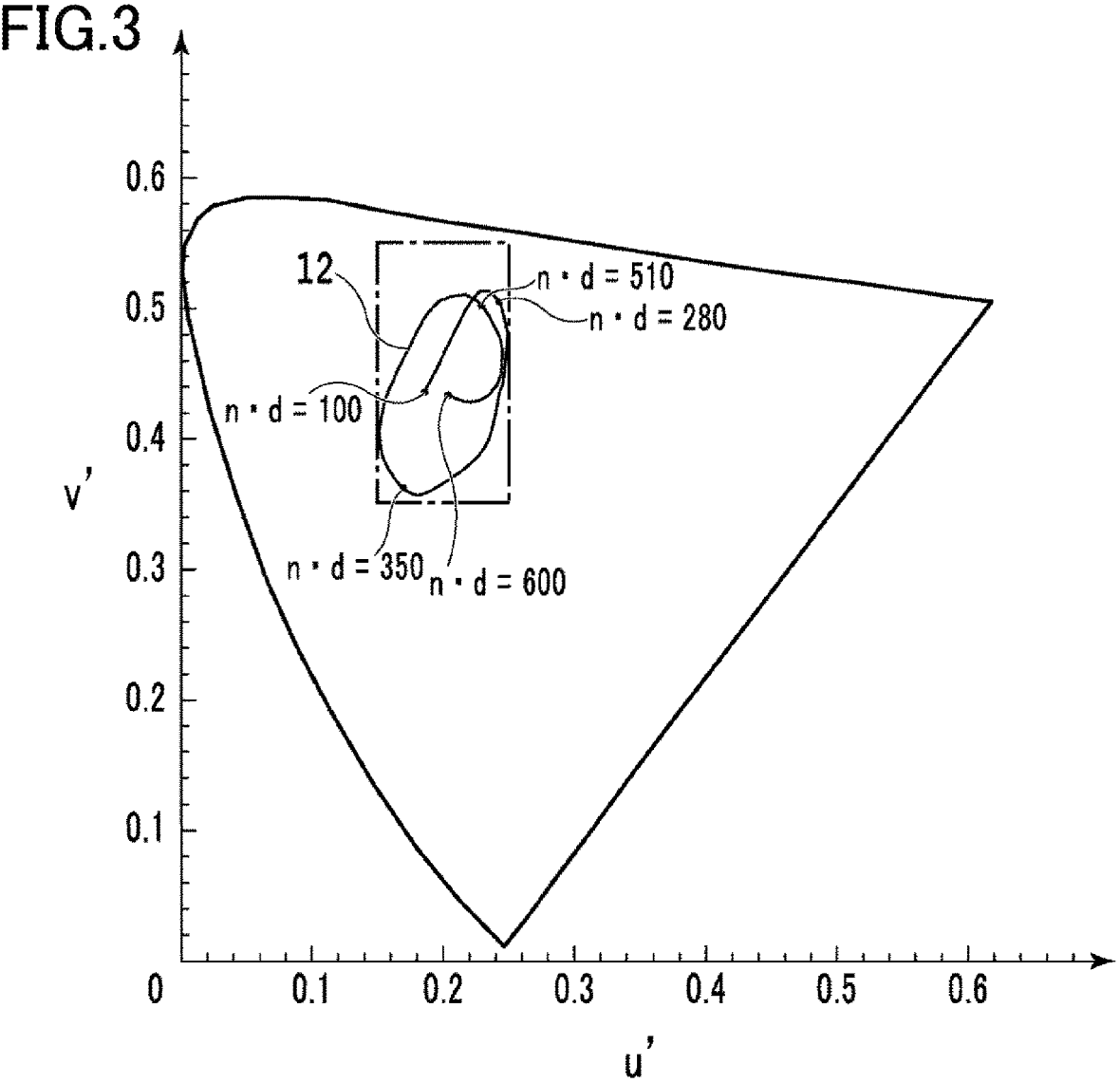
FIG. 3 is a diagram showing color change of the display by curved lines on a CIE 1976 UCS u' v' chromaticity diagram.

Let us assume a display in which the optical distances between the flat bottoms and the flat tops are the same throughout the uneven-structure-forming regions of the uneven-structure-forming layer 2. FIG. 3 is a diagram showing changes of displayed color when the optical distance is changed. The changes are shown with the curved line 12 on the CIE 1976 UCS u'v' chromaticity diagram (hereinafter may also be referred to as u'v' chromaticity diagram). More specifically, let us assume a display having one kind of optical distance n·d. In the display, the optical distances are continuously changed in the range of 100-600 nm. The displayed colors resulting from the continuous change are used as a basis to determine values of u' and v' corresponding to the respective optical distances. These values are plotted on the u' v' chromaticity diagram to thereby obtain the curved line 12 shown in FIG. 3. The uneven-structure-forming layer of the display used here has an uneven structure in which a plurality of convexities are randomly arranged, the flat top of each convexity is in a square shape, the length of one side thereof is 0.8 μm, and the area ratio occupied by the flat tops of the convexities is 26%.

As shown in FIG. 3, the curved line 12 which indicates the color change sequentially passes through a warm region, a cold region, and a neutral (green) region, as the optical distance n·d gradually increases from 100 nm. Thus, to cause a display to develop a color among the colors of the passing region, the display may be produced at an optical distance which corresponds to the color to be developed.

However, it is not easy to precisely form the optical distance between the flat bottoms and the flat tops of the uneven-structure-forming layer 2. Because of this, the value of an optical distance set at the design stage may be different from the actual value, and color shift may occur in the color development of the display 10.

Figure 4:
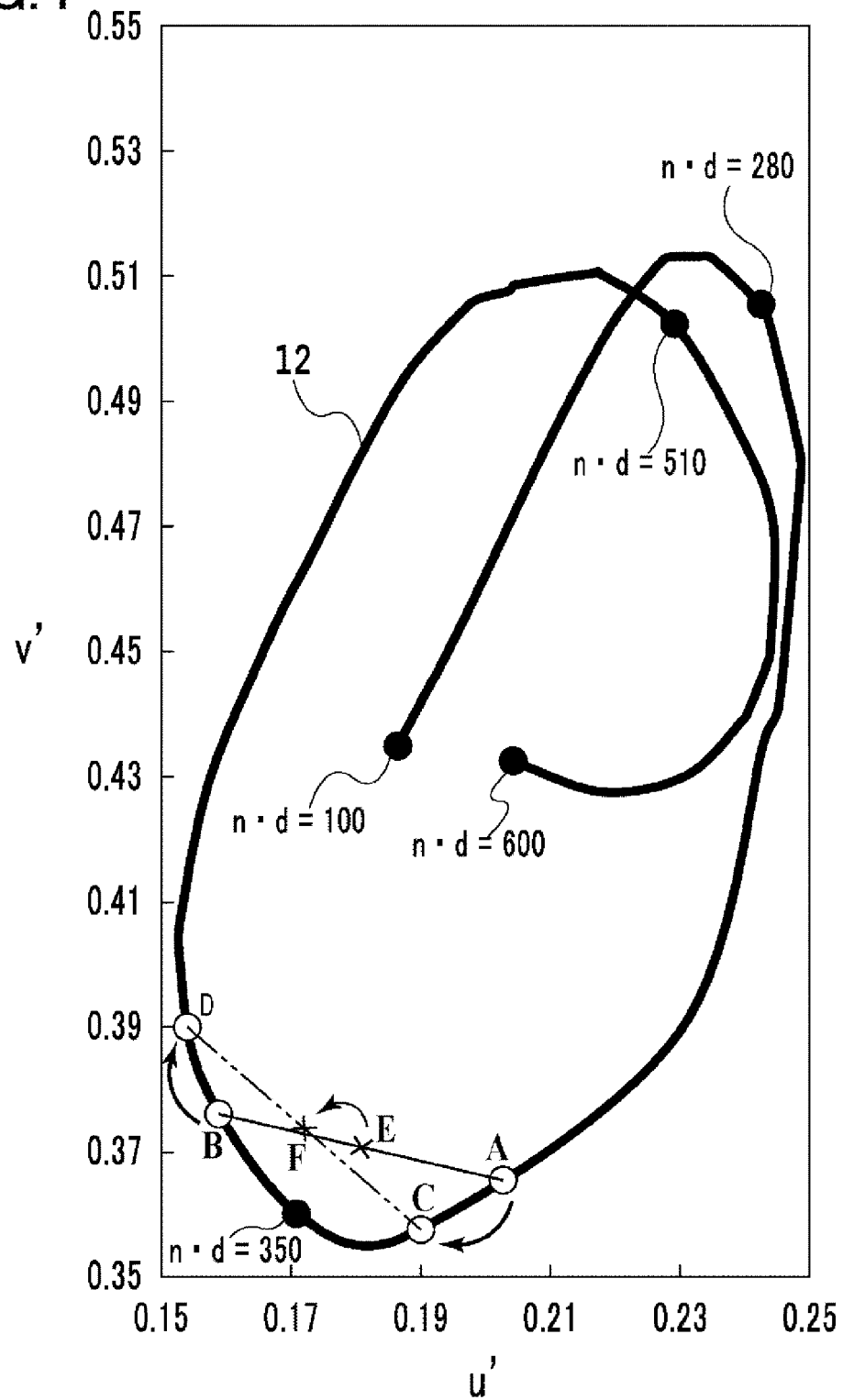
FIG. 4 is an enlarged view of a portion circled by the dash-dot line of FIG. 3.

To cope with this, two or more kinds of uneven-structure-forming regions are provided to the uneven-structure-forming layer 2 to provide predetermined optical distances which are different between the regions and to thereby reduce color shift. With reference to FIG. 4, in the following, a description will be given of the reason why the color shift can be reduced.

For clarity, let us assume that two kinds of uneven-structure-forming regions are provided in the uneven-structure-forming layer 2 of the display 10. FIG. 4 is an enlarged view of the portion surrounded by the dash-dot line of FIG. 3. Let us assume that the optical distances between the flat bottoms and the flat tops provided to each region of the uneven-structure-forming layer 2 of the display 10 are set to the optical distances at points A and B shown in FIG. 4. It is also assumed that, in the produced display 10, the optical distances set at points A and B change into the optical distances corresponding to point C and point D, respectively. Normally, in producing the display 10, the distance between the flat bottoms and the flat tops of the uneven-structure-forming layer 2 (the height of the convexities) changes uniformly over the overall uneven-structure-forming regions with respect to the set value. Therefore, the optical distance between the flat bottoms and the flat tops, which is a value obtained by multiplying the distance between the flat bottoms and the flat tops (the height of the convexities) by the refractive index of the medium, also changes accordingly over the overall uneven-structure-forming regions, with respect to the set value. Thus, the increase of the optical distance in the change from point A to point C is equal to the increase of the optical distance in the change from point B to point D.

In the display 10 provided with the uneven-structure-forming layer 2 having alternately arrayed two kinds of uneven-structure-forming regions with different optical distances, colors generated from the respective regions are mixed. This color mixing corresponds to the midpoint of the line segment connecting between two points on the curved line 12 indicating the color change. Therefore, if the optical distances at points A and B are taken to be the optical distance in each uneven-structure-forming region, the observer perceives the color corresponding to a midpoint E of the line segment which connects the two points. However, in the display 10 produced based on the optical distances corresponding to points A and B as set values, if the optical distances change into points C and D, respectively, the observer perceives the color corresponding to a midpoint F of the line segment connecting point C and point D as a mixture of colors. It can be said that the distance between the points E and F indicates the color difference between the color actually perceived by the observer (point F) and the color initially set (point E), because the distance between the two points on the chromaticity diagram indicates the degree of color shift (color difference).

In contrast, let us assume that the optical distance between the flat bottoms and the flat tops of the uneven-structure-forming regions are constant throughout the regions, and as a result of producing a display with an optical distance corresponding to point A as a set value, the display has an optical distance corresponding to point C. In this case, the difference between the color actually perceived by the observer and the set color is indicated by the distance between point A and point C. As can be seen from FIG. 4, the distance between points A and C is greater than the distance between point E and point F. As described above, the display 10, having the uneven-structure-forming layer 2 with two kinds of uneven-structure-forming regions provided therein and with predetermined optical distances different from each other, can reduce color shift from the originally set color, comparing with the display having a constant optical distance throughout the uneven-structure-forming regions. For the same reason, the color shift which is due to the change of the optical distance caused by the change of the refractive index of the uneven-structure-forming layer 2 and the transparent layer 6 can be reduced.

In the above, a description has been given of the display 10 having the uneven-structure-forming layer 2 which is provided with two kinds of uneven-structure-forming regions. However, the description also applies to the case of the uneven-structure-forming layer 2 which is provided with three or more uneven-structure-forming regions. If two kinds of uneven-structure-forming regions are provided, the color perceived by the observer corresponds to the midpoint of the line segment connecting the two points on the curved line 12 which indicates the color change. In contrast, if three or more kinds of uneven-structure-forming regions are provided, the color perceived by the observer corresponds to the center of gravity of a polygon formed by connecting a plurality of points corresponding to the optical distances of the respective regions, which are on the curved line 12 indicating the color change (e.g., center of gravity of a triangle in the case of three points, and center of gravity of a quadrangle in the case of four points).

A description will now be given of a method of setting an optical distance in each region to reduce color shift, in the case where two kinds of uneven-structure-forming regions are provided in the uneven-structure-forming layer 2, with the optical distance being made different therebetween.

Figure 5:
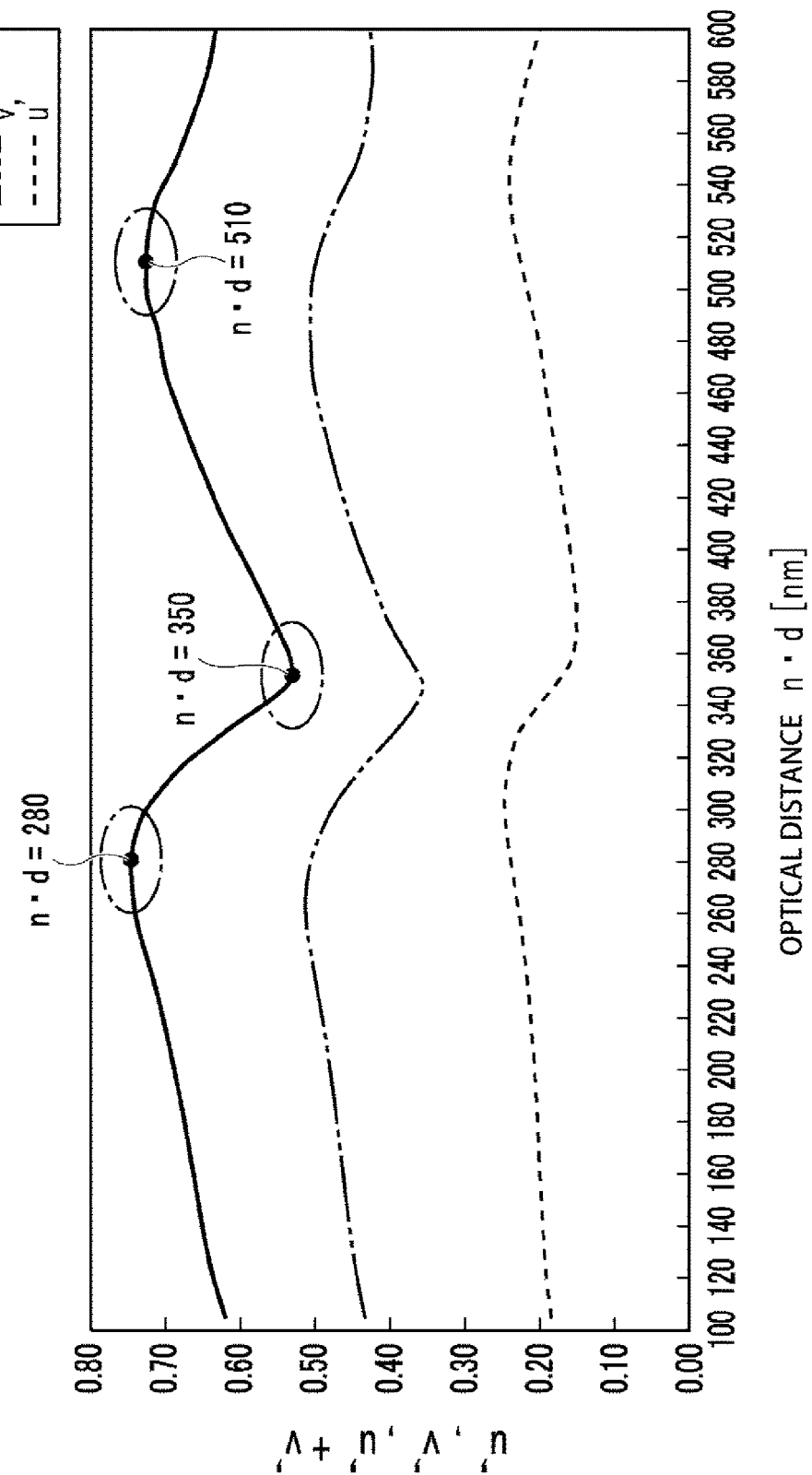
FIG. 5 is a graph showing the optical distance on the horizontal axis, and u', v', and u'+v' on the vertical axis.

As described above, the curved line 12, which shows the color change of the display 10 shown in FIGS. 3 and 4, represents the optical distances n·d in the range of 100-600 nm on the u'v' chromaticity diagram. Therefore, the position corresponding to the respective optical distances n·d on the curved line 12 can be specified in the coordinates (u', v'). Taking this into account, by using the optical distances n·d and u', v' corresponding thereto, a graph has been created in which the optical distance is taken as the horizontal axis, and u', v' and u'+v' are taken as the vertical axis. The graph is shown in FIG. 5. In the figure, the dashed line indicates u', the dash-dot-dot line indicates v', and the solid line indicates u'+v'.

Referring to the graph of u', u' gradually increases from n·d=100 to around n·d=300, then decreases to around n·d=370, and again increases to around n·d=540, and then decreases again. Thus, increase or decrease of u' occurs at three points where the optical distances n·d are approximately 300, 370, and 540. Similarly, in the graph of v', increase or decrease of v' occurs at three points where the optical distances n·d are approximately 270, 340, and 500.

Let us assume a case for producing the display 10, where the uneven-structure-forming regions are provided to the display 10, and different optical distances are determined for the respective regions. In this case, let us also assume that the optical distance in one kind of region is selected from the range where both u' and v' increase, and the optical distance in another kind of region is selected from the range where both u' and v' decrease. In this case, even if the optical distances provided to the respective regions vary after the display 10 is produced, the changes act so as to cancel each other (conjugate action) at the point corresponding to the color to be displayed. Thus, the color shift is also reduced. In the case of providing two kinds of uneven-structure-forming regions, let us assume that an optical distance to be provided in one kind of region is selected from a region where both u' and v' increase, and an optical distance to be provided in another kind of region is selected from a region where both u' and v' decrease. In the display 10 in which the optical distances are selected in this manner, even if the optical distance provided in each region varies after the display 10 is produced, the changes act so as to cancel each other (conjugate action) at the point corresponding to the color to be displayed (i.e. at the midpoint of the line segment connecting the two points). Therefore, the variation at the midpoint is reduced, and thus, the color shift from the originally determined color also becomes smaller.

As described above, the inflection points where increase/decrease of u' varies (three points where the optical distances n·d are 300, 370, and 540, respectively) do not coincide with the inflection points of v' (three points where n·d are 270, 340, and 500, respectively). This leads to a problem of how to select the optical distances to be provided in each region. Therefore, with respect to the optical distances n·d, a point of increase or decrease of the sum of u' and v' (u'+v') inflection points) is derived from the graph showing the change of the sum of u' and v'(u'+v'), to thereby select the optical distance of each region around this point.

In the graph of u'+v' shown in FIG. 5, there are three inflection points where the optical distances are approximately 280 nm, 350 nm, and 510 nm, respectively. Therefore, if an optical distance which is different between the uneven-structure-forming regions is set within the range of 100-600 nm, the optical distance in each region may be set around these three points.

That is, when the uneven surface of the uneven-structure-forming layer 2 is formed, of the uneven-structure-forming regions, the value of the optical distance in one kind of uneven-structure-forming region may be selected from the range of 100-280 nm, and the value of the optical distance in the other kind of uneven-structure-forming region may be selected from the range of 280-350 nm. Alternately, the value of the optical distance in one kind of uneven-structure-forming region may be selected from the range of 280-350 nm, and the value of the optical distance in the other kind of uneven-structure-forming region may be selected from the range of 350-510 nm. Alternatively, the value of the optical distance in one kind of uneven-structure-forming region may be selected from the range of 350-510 nm, and the value of the optical distance in the other kind of uneven-structure-forming region may be selected from the range of 510-600 nm. Note that, the values of the two kinds of selected optical distances are different from each other.

In particular, if the uneven-structure-forming layer 2 includes two kinds of uneven-structure-forming regions, the value of the optical distance in one kind of uneven-structure-forming region may be selected from the range of 100-280 nm, and the value of the optical distance in the other kind of uneven-structure-forming region may be selected from the range of 280-350 nm. Alternatively, the value of the optical distance in one kind of uneven-structure-forming region may be selected from the range of 280-350 nm, and the value of the optical distance in the other kind of uneven-structure-forming region may be selected from the range of 350-510 nm. Alternatively, the value of the optical distance in one kind of uneven-structure-forming region may be selected from the range of 350-510 nm, and the value of the optical distance in the other kind of uneven-structure-forming region may be selected from the range of 510-600 nm. Note that, the values of the two kinds of selected optical distances are different from each other.

The optical distance can be determined according to the display color. In the case of displaying warm colors, the value of the optical distance in at least one kind of uneven-structure-forming region may be selected from the range of 100-280 nm, and the value of the optical distance in the other kind of uneven-structure-forming region may be selected from the range of 280-350 nm. In the case of displaying cold colors, the value of the optical distance in one kind of uneven-structure-forming region may be selected from the range of 280-350 nm, and the value of the optical distance in the other kind of uneven-structure-forming region may be selected from the range of 350-510 nm.

In the display 10 produced by setting the optical distance as described above, each optical distance may vary depending on production methods and production conditions. Assuming that the optical distances vary by approximately 10% with respect to the above-mentioned set values, the optical distance in one kind of uneven-structure-forming region in the uneven-structure-forming region of the uneven-structure-forming layer 2 in the produced display 10 is in the range of 90-308 nm, and the optical distance in the other kind of uneven-structure-forming region is in the range of 252-385 nm. Alternatively, the optical distance in one kind of uneven-structure-forming region is in the range of 252-385 nm, and the optical distance in the other kind of uneven-structure-forming region is in the range of 315-561 nm. Alternatively, the optical distance in one kind of uneven-structure-forming region is in the range of 315-561 nm, and the optical distance in the other kind of uneven-structure-forming region is in the range of 459-660 nm.

As described above, when the uneven surface of the uneven-structure-forming layer 2 is formed, the set values of the optical distances in the respective uneven-structure-forming regions can be a combination of values selected from specific ranges. Thus, color shift of the display 10 can be reduced, which would otherwise be caused during the production of the display 10. As a result, the display 10 is less likely to undergo a color shift due to the change of the optical distance at the time of being produced. Therefore, the productivity is enhanced.

(Method of Producing Display)

A description will now be given of a method of producing the display 10.

The display 10 can be produced by appropriately selecting an appropriate method from known methods, according to the materials and layer configurations of the respective layers.

First, the uneven-structure-forming layer 2 which constitutes the display 10 can be formed as follows.

When polypropylene (PP), polyethylene (PE) or the like is used as the material for the uneven-structure-forming layer 2, the extrusion molding method or the like can be applied. The uneven-structure-forming layer 2 can be formed: contacting a molten resin with a cooling roll which has an uneven structure formed on a surface thereof to transfer the uneven pattern on the surface of the cooling roll to the molten resin, followed by cooling and solidifying. The distance between the flat bottoms and the flat tops in the uneven structure provided to the surface of the cooling roll is determined according to the set value of the optical distance provided to each uneven-structure-forming region of the uneven-structure-forming layer 2.

When the uneven-structure-forming layer 2 includes a substrate as a base material, the uneven-structure-forming layer 2 may be formed by: applying a thermoplastic resin or a photo curable resin onto a substrate made of polyethylene terephthalate (PET); closely contacting a metal stamper having asperities with the coating film; heating or irradiating the resin layer with light in this state to cure the resin; and removing the metal stamper from the cured resin.

The metal stamper can be formed by a method of directly forming an uneven structure on a metal surface, mechanically forming an uneven structure on a copper layer or a nickel layer of a roll surface using a cutting tool such as a diamond tool, selective etching of a metal surface using a photosensitive material through an exposure process; or processing a metal surface thorough ablation using laser light or the like. The distance between the flat bottoms and the flat tops in the uneven structure provided on the surface of the metal stamper is determined according to the set value of the optical distance provided to each uneven-structure-forming region of the uneven-structure-forming layer 2.

A preferable method of obtaining the metal stamper having fine asperities is one including drawing a pattern on a photoresist plate by using a stepper device, an electron beam lithography device, or the like (exposure), and developing the pattern to obtain an original plate, and then performing electroforming using the original plate. The exposure intensity at the time of drawing a desired pattern on the photoresist layer is determined according to the set value of the optical distance provided to each uneven-structure-forming region of the uneven-structure-forming layer 2.

Then, a metal such as aluminum, or a dielectric material, is deposited on the uneven structure forming layer 2 by a method such as vapor deposition, sputtering, or a silver mirror treatment for formation into a single layer or a multilayer, thereby forming a light reflecting layer 4. It should be noted that a light reflecting layer 4 that only covers a part of the uneven-structure forming layer 2, that is, a patterned light reflecting layer 4 is obtained by forming a reflecting layer 4 as a continuous film by vapor phase deposition method, followed by dissolving a part thereof with a chemical or the like.

The display 10 may be a transfer foil, a label, or a sticker. The display 10 can be used by transferring, sticking, or watermarking a security medium. The security medium may be a paper currency, a card, or a booklet. The small color shift of the display can facilitate authentication of the security medium. As described above, the display 10 can be applied to a security device such as a paper currency, a card, a sticker, or a booklet. The display 10 can also be used for decoration of a package, a card, a label, or the like.

REFERENCE SIGNS LIST

2 . . . Uneven-structure-forming layer; 4 . . . Light reflecting layer; 2a, 2A . . . Flat top; 2b, 2B . . . Flat bottom; 10 . . . Display

What is claimed is:
1. A display comprising:
an uneven-structure-forming layer having an uneven surface provided with a plurality of concavities or a plurality of convexities respectively provided with flat bottoms and flat tops substantially parallel to the flat bottoms,
a light reflecting layer covering all or a part of an uneven surface of the uneven-structure-forming layer, wherein the uneven-structure-forming layer comprises a first kind of uneven-structure-forming regions and a second kind of uneven-structure forming regions,
wherein each the of uneven-structure-forming regions of the first kind has a first constant distance between the flat bottoms and the flat tops, each of uneven-structure-forming regions of the second kind has a second constant distance between the flat bottoms and the flat tops, and the first distance being different from the second distance;
wherein uneven-structure-forming regions of the first kind and the second kind are alternately and repetitively arrayed;
the first distance is selected from a range where a sum of chromaticity coordinates of the display increases with an increase of the first distance; and the second distance is selected from a range where a sum of chromaticity coordinates of the display decreases with an increase of the second distance.

2. The display of claim 1, wherein the plurality of concavities or the plurality of convexities are randomly arranged in each of the uneven-structure-forming regions.

3. The display of claim 1, wherein the first kind of uneven-structure-forming regions has a first optical distance which is a product of the first distance and a refractive index of the uneven-structure-forming layer and the second kind of uneven-structure-forming regions has a second optical distance which is a product of the second distance and the refractive index of the uneven-structure-forming layer.

4. The display of claim 3, wherein a set value of the first optical distance is selected from a range of 100-280 nm and a set value of the second optical distance is selected from a range of 280-350 nm.

5. The display of claim 3, wherein a set value of the first optical distance is selected from a range of 280-350 nm and a set value of the second optical distance is selected from a range of 350-510 nm.

6. The display of claim 3, wherein a set value of the first optical distance is selected from a range of 350-510 nm and a set value of the second optical distance is selected from a range of 510-600 nm.

7. The display of claim 1, further comprising a transparent layer protecting the light reflecting layer, wherein the first kind of uneven-structure-forming regions has a first optical distance which is a product of the first distance and a refractive index of the transparent layer and the second kind of uneven-structure-forming regions has a second optical distance which is a product of the second distance and the refractive index of the transparent layer.

8. The display of claim 7, wherein a set value of the first optical distance is selected from a range of 350-510 nm and a set value of the second optical distance is selected from a range of 510-600 nm.

9. The display of claim 7, wherein a set value of the first optical distance is selected from a range of 100-280 nm and a set value of the second optical distance is selected from a range of 280-350 nm.

10. The display of claim 7, wherein a set value of the first optical distance is selected from a range of 280-350 nm and a set value of the second optical distance is selected from a range of 350-510 nm.

11. A display comprising:
an uneven-structure-forming layer having an uneven surface provided with a plurality of concavities or a plurality of convexities respectively provided with flat bottoms and flat tops substantially parallel to the flat bottoms; and
a light reflecting layer covering all or a part of an uneven surface of the uneven-structure-forming layer, wherein:
the uneven-structure-forming layer comprises a first kind of of uneven-structure-forming regions and a second kind of uneven-structure-forming regions;
each of the uneven-structure-forming regions of the first kind has a first constant optical distance and each of uneven-structure-forming regions of the second kind has a second constant optical distance, which is different from the first optical distance, and;
wherein uneven-structure-forming regions of the first kind and the second kind are alternately and repetitively arrayed; and wherein
the first optical distance is selected from a range of 90-308 nm, and the second optical distance is selected from a range of 252-385 nm, or
the first optical distance is selected from a range of 252-385 nm, and the second optical distance is selected from a range of 315-561 nm, or
the first optical distance is selected from a range of 315-561 nm, and the second optical distance is selected from a range of 459-660 nm, the first optical distance being different from the second optical distance.

12. The display of claim 11, wherein, the first optical distance is selected from a range of 252-385 nm, and the second optical distance is selected from a range of 315-561 nm.

* * * * *